UNITED STATES PATENT OFFICE.

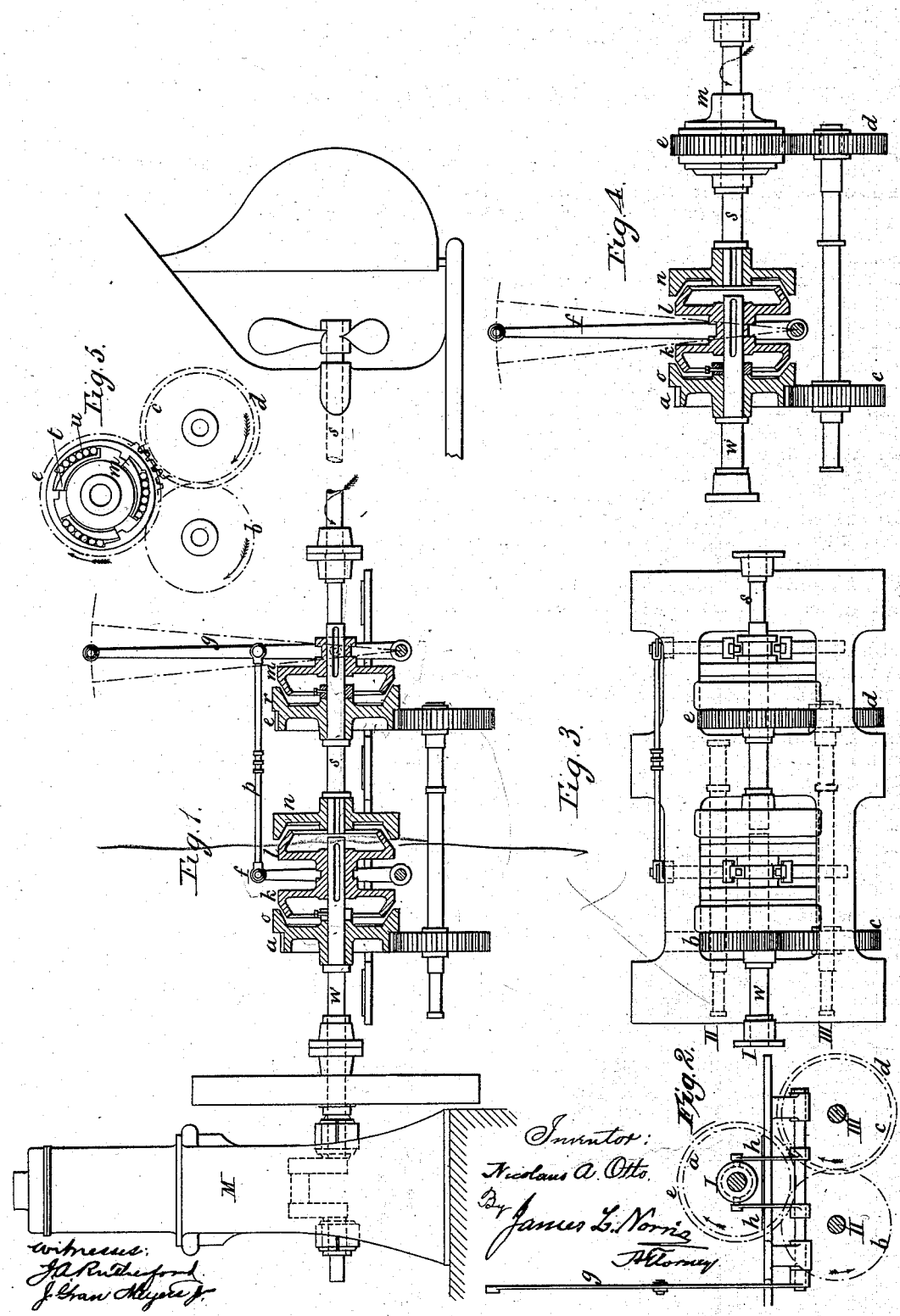

NICOLAUS AUGUST OTTO, OF COLOGNE, PRUSSIA, ASSIGNOR TO THE GAS-MOTOREN-FABRIK-DEUTZ, OF DEUTZ, GERMANY.

REVERSING MECHANISM.

SPECIFICATION forming part of Letters Patent No. 410,012, dated August 27, 1889.

Application filed April 24, 1889. Serial No. 308,463. (No model.) Patented in England April 2, 1889, No. 5,616; in Belgium April 10, 1889, No. 85,724, and in France April 27, 1889, No. 197,791.

*To all whom it may concern:*

Be it known that I, NICOLAUS AUGUST OTTO, a citizen of Prussia, residing at Cologne, in the Empire of Germany, have invented a new and useful Improved Mechanism for Reversing the Motion Derived from a Motor-Shaft, applicable to the motor-engines of vessels and vehicles, and for other purposes, (for which I have obtained patents in Belgium, dated April 10, 1889, No. 85,724; in France, dated April 27, 1889, No. 197,791, and have made application for patent in Great Britain, which patent, when granted, will bear date April 2, 1889, No. 5,616,) of which the following is a specification.

When propelling boats and vehicles by means of motor-engines whose motion always takes place in one and the same direction—such, for instance, as gas and petroleum motor-engines—the reversal of the motion of the boat or vehicle is generally effected by means of toothed reversing-gear which is always in motion and is made to reverse the motion by means of a ratchet or clutch mechanism, so that in whatever direction the boat or vehicle is moving the said toothed gear is always in motion, causing not only a very unpleasant noise, but also considerable wear and tear of the gearing.

With vehicles, and more particularly with boats, the direction of rotation corresponding to the forward motion is mainly in use, that for the backward motion being comparatively seldom applied and then only for a short time.

The present invention relates to mechanism for reversing motion so arranged that during the forward motion of the boat or vehicle all the toothed gearing of the mechanism stands still, this being only put in rotation during the backward motion of the boat or vehicle. By this arrangement there is, under ordinary circumstances, no wear and tear of nor noise arising from the gearing.

For the above purpose the propeller or other shaft to be driven is arranged in line with the motor-shaft, and the two shafts are connected directly together for the forward motion by a clutch apparatus, by preference a conical friction-clutch, the fixed part of which is by preference on the driven shaft, while the longitudinally-sliding part is on the motor-shaft and is connected to the sliding part of a second similar clutch on the same shaft, the other part of which clutch is loose on the motor-shaft, but cannot slide longitudinally thereon. This part of the second clutch carries a toothed ring which gears, through an intermediate wheel, with another toothed wheel on a way-shaft. This shaft carries a second toothed wheel gearing with a toothed ring on a clutch apparatus on the driven shaft. This clutch apparatus is so arranged that while it is itself stationary it allows the free rotation of the driven shaft when this is rotated directly by the motor-shaft through the first-mentioned clutch, but is made to rotate and carry the shaft round with it when it is driven through the way-shaft and toothed gearing, such motion being in the contrary direction to that of the motor-shaft. The two clutches on the motor-shaft are so arranged to be worked by a single lever that when the direct-acting one is put in gear thereby the one acting through the toothed gear endway-shaft is put out of gear, and vice versa, while in a middle position of the clutches the motor-shaft runs free of the driven shaft. The clutch mechanism on the latter may be variously arranged to operate in the manner described. Thus it may be of the same construction as the clutches on the motor-shaft and its sliding part be connected to the lever controlling the latter, so as to be put out of gear when the direct-action clutch is in gear and be put in gear simultaneouly with the reversing-clutch; or it may consist of any of the known mechanisms that serve to communicate motion in one direction only, such as those of the pawl-and-ratchet wheel kind, or those with fixed or loose inclines or wedges operating in combination with rollers or differential friction-clutches, &c.

It will be readily understood that the above-described mechanism is applicable in all cases where it is desired to obtain rotary motion in either direction from a shaft that is driven continuously in one and the same direction.

On the accompanying drawings is shown, by way of example, an arrangement of the above-described reversing mechanism for communicating motion in either direction from a gas or petroleum motor-engine M, whose shaft $w$ is always driven in one and the same direction to the shaft $s$ of a ship's propeller.

Figure 1 shows a longitudinal section; Fig. 2, a cross-section; Fig. 3, a plan, and Figs. 4 and 5 show, respectively, a longitudinal section and cross-section of a modified arrangement.

The shaft $w$ of the motor-engine is in the same axial line as the shaft $s$ of the propeller, and they are capable of being geared together by the friction-clutch $l\ n$, of which the part $n$ is fixed on shaft $s$, while $l$, sliding on a feather on $w$, can be moved in and out of gear with $s$, so that when the clutch is in gear the motor-engine drives the propeller-shaft direct for the forward motion.

With the part $l$ of the clutch is combined the corresponding sliding part $k$ of a second clutch, whose other part $o$ is loose on the shaft $w$, but is confined between collars thereon. This part carries a toothed ring $a$, which gears with a spur-wheel $b$ on a shaft II, which wheel gears with a spur-wheel $c$ on a shaft III. This shaft carries another spur-wheel $d$, which is in gear with a toothed ring $e$ on the part $r$ of a friction-clutch on the driven shaft $s$, such part $r$ being loose on the shaft, but capable of being fixed thereon by the sliding part $m$ of the clutch. The sliding parts $k$, $l$, and $m$ of the three clutches are all actuated simultaneously by the hand-lever $g$, through levers $f\ h$ and rod $p$, in such manner that when in the position shown all three clutches are out of gear and the engine-shaft is consequently unconnected with the propeller-shaft. If the lever $g$ be moved to the right hand, the clutch $l\ n$ is put in gear and the propeller-shaft is driven directly by the engine-shaft. If the lever $g$ be moved to the left hand, then clutch $l\ n$ is thrown out of gear and clutches $o\ k$ and $r\ m$ are both thrown in gear, and consequently the shaft $s$ is driven by the engine-shaft through the gearing $a\ b\ c\ d\ e$, whereby the direction of motion is reversed.

As before stated, there may be employed in place of the clutch $r\ m$ an automatically-acting clutch—such, for instance, as that shown at Figs. 4 and 5—whereby the shaft $s$ is free to revolve within the clutch while this is stationary, and the shaft is driven direct by the engine by the clutch $l\ n$, as before, but whereby, when the clutch $m$ is driven through the gearing $a\ b\ c\ d\ e$, it carries the shaft $s$ round with it in the contrary direction to that of the engine-shaft. In the arrangement shown this is effected by means of sliding wedge-pieces $t$ upon a disk $m$, fixed on the shaft $s$, and anti-friction rollers $u$, situated between these wedge-pieces and the inner surface of the rim on the toothed disk $e$, which is loose on the shaft $s$, so that when the disk $e$ is rotated by the wheel $d$ the wedges and rollers cause $m$ to be firmly held by $e$, so as to be carried round thereby. If, on the other hand, shaft $s$ is rotated in the contrary direction while $e$ remains stationary, the grip of the wedges and rollers is released.

Having thus described the nature of my invention and the best means I know of carrying the same into practical effect, I claim—

1. In apparatus for reversing motion, the combination, with a driving-shaft and a driven shaft lying in the same axial line, of a clutch gearing them together for driving the driven shaft direct in one direction, a second clutch on the driving-shaft, one part of which is loose thereon and carries a toothed ring, toothed gearing connecting such toothed ring, through an intermediate wheel, with a toothed ring on a third clutch on the driven shaft, which third clutch is stationary and allows the driven shaft to rotate independently of it when the first clutch is in gear for driving the shaft direct, but which carries the shaft round with it when rotated in the contrary direction to the driving-shaft through the second clutch and intermediate gearing, substantially as herein set forth.

2. In apparatus for reversing motion, the combination, with a motor-shaft $w$ and driven shaft $s$, of a double conical friction-clutch $o\ k\ l\ n$, of which the part $o$ is loose on shaft $w$ and carries a toothed ring $a$, while parts $k$ and $l$ slide on shaft $w$, and part $n$ is fixed on shaft $s$, conical friction-clutch $r\ m$, of which the part $r$ is loose on shaft $s$ and carries toothed ring $e$, while part $m$ slides on shaft $s$, toothed gear $b\ c\ d$, connecting toothed ring $a$ with toothed ring $e$, and levers $g\ f\ h$ and connecting-rod $p$, whereby the parts $k\ l\ m$ of the three clutches are all operated simultaneously, substantially as and for the purposes set forth.

In testimony whereof I have signed my name to this specification, in the presence of two subscribing witnesses, this 9th day of April A. D. 1889.

NICOLAUS AUGUST OTTO.

Witnesses:
 PET. LANGEN KÖLN,
 EDUARD KIRSCHSIEPER.